(12) United States Patent
Narasimhan et al.

(10) Patent No.: US 11,269,614 B2
(45) Date of Patent: Mar. 8, 2022

(54) TRANSFER OF FIRMWARE UPDATES USING AN IN-BAND INTERFACE

(71) Applicant: Dell Products, L.P., Round Rock, TX (US)

(72) Inventors: Krishnakumar Narasimhan, Chennai (IN); Anusha Bhaskar, Bangalore (IN); Muniswamy Setty K S, Bangalore (IN); Parmeshwr Prasad, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 205 days.

(21) Appl. No.: 16/813,888

(22) Filed: Mar. 10, 2020

(65) Prior Publication Data

US 2021/0286608 A1    Sep. 16, 2021

(51) Int. Cl.
| | |
|---|---|
| *G06F 9/44* | (2018.01) |
| *G06F 8/65* | (2018.01) |
| *G06F 13/16* | (2006.01) |
| *G06F 9/4401* | (2018.01) |

(52) U.S. Cl.
CPC .............. *G06F 8/65* (2013.01); *G06F 9/4411* (2013.01); *G06F 13/1668* (2013.01)

(58) Field of Classification Search
CPC ....... G06F 8/65; G06F 9/4411; G06F 13/1668
See application file for complete search history.

(56) References Cited

U.S. PATENT DOCUMENTS

| | | | |
|---|---|---|---|
| 2010/0082932 A1* | 4/2010 | Rothman | G06F 9/44505 711/166 |
| 2014/0007069 A1* | 1/2014 | Cavalaris | G06F 8/654 717/170 |
| 2017/0270301 A1* | 9/2017 | Vidyadhara | G06F 21/575 |
| 2019/0026126 A1* | 1/2019 | Liu | G06F 9/44505 |
| 2019/0278583 A1* | 9/2019 | Nie | G06F 13/102 |
| 2020/0301616 A1* | 9/2020 | Ciocari | G06F 9/4403 |

* cited by examiner

*Primary Examiner* — Hang Pan
(74) *Attorney, Agent, or Firm* — Fogarty LLP (57) ABSTRACT

Systems and methods for transferring firmware updates using an in-band interface are described. In an embodiment, an Information Handling System (IHS) may include a processor and a memory coupled to the processor, the memory having program instructions stored thereon that, upon execution, cause the IHS to: receive a firmware update package having a payload; create a namespace in a persistent memory; copy the payload to a segment of the persistent memory associated with the namespace; and write, to an Extensible Firmware Interface (EFI) variable, an Emulator Device Path (EDP) pointing to the payload.

11 Claims, 3 Drawing Sheets

TRANSFER OF FIRMWARE UPDATES USING AN IN-BAND INTERFACE

FIELD

The present disclosure generally relates to Information Handling Systems (IHSs), and, more particularly, to the transfer of firmware updates using an in-band interface.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In the context of IHSs, firmware is a specific class of computer software that provides low-level control for an IHS's specific hardware or device. Changing or updating the firmware of an IHS's device is a common procedure for fixing bugs or adding features to the device. In some cases, a Remote Access Controller (RAC) may be used by an IHS to provide an out-of-band management platform, including the performance of firmware updates, which may be received by the RAC over a network.

The inventors hereof have recognized, however, that firmware updates with payloads that are staged to a RAC are slow due to the high latency of the sideband bus data transfer that ordinarily couples the RAC to each of the IHS's devices. In those cases, a significant portion of the update time is spent in transferring a firmware image from the RAC to the device over the sideband bus. Other firmware update alternatives, such as the Remote BIOS Update (RBU) approach, for example, also produce high latency due to packet gathering and rebuilding processes, as the IHS scans an entire memory range to collate RBU packets and rebuild the firmware image.

To address these, and other issues, systems and methods described herein can reduce or overcome the latency involved in RAC-based firmware updates, at least in part, by using a employing an in-band interface rather than a sideband interface.

SUMMARY

Systems and methods for transferring firmware updates using an in-band interface are described. In an illustrative, non-limiting embodiment, an Information Handling System (IHS) may include a processor and a memory coupled to the processor, the memory having program instructions stored thereon that, upon execution, cause the IHS to: receive a firmware update package having a payload; create a namespace in a persistent memory; copy the payload to a segment of the persistent memory associated with the namespace; and write, to an Extensible Firmware Interface (EFI) variable, an Emulator Device Path (EDP) pointing to the payload.

In some embodiments, the receiving, creating, copying, and writing may be performed by an Operating System (OS). The persistent memory may include a non-volatile dual in-line memory module (NVDIMM) or storage class memory (SCM). The emulator device path may be provided by a kernel driver. The program instructions, upon execution, may cause the IHS to reboot.

The program instructions, upon execution, may cause the IHS to: produce a device path map; compare a device path map against the EDP; and in response to the EDP matching a path in the device path map, obtain the payload and update a corresponding device's firmware using the payload. In some cases, the creating, producing, comparing, and obtaining may be performed by a Basic Input/Output System (BIOS).

In another illustrative, non-limiting embodiment, a memory storage device may have program instructions stored thereon that, upon execution by one or more processors of an IHS, cause the IHS to: receive a firmware update package having a payload; create a namespace in a persistent memory; copy the payload to a segment of the persistent memory associated with the namespace; and write, to an EFI variable, an EDP pointing to the payload.

The receiving, creating, copying, and writing may be performed by an OS. The persistent memory may include an NVDIMM or SCM. Moreover, the EDP may be provided by a kernel driver.

The program instructions, upon execution, may cause the IHS to reboot. The program instructions, upon execution, may further cause the IHS to: produce a device path map; compare a device path map against the EDP; and in response to the EDP matching a path in the device path map, obtain the payload and update a corresponding device's firmware using the payload. The producing, comparing, and obtaining may be performed by a BIOS.

In yet another illustrative, non-limiting embodiment, a method may include: receiving a firmware update package having a payload; creating a namespace in a persistent memory; copying the payload to a segment of the persistent memory associated with the namespace; and writing, to an EFI variable, an EDP pointing to the payload.

The receiving, creating, copying, and writing may be performed by an OS. The EDP may be provided by a kernel driver. The method may also include rebooting the IHS. The method may further include: producing a device path map; comparing a device path map against the EDP; and in response to the EDP matching a path in the device path map, obtaining the payload and update a corresponding device's firmware using the payload. The producing, comparing, and obtaining may be performed by a BIOS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
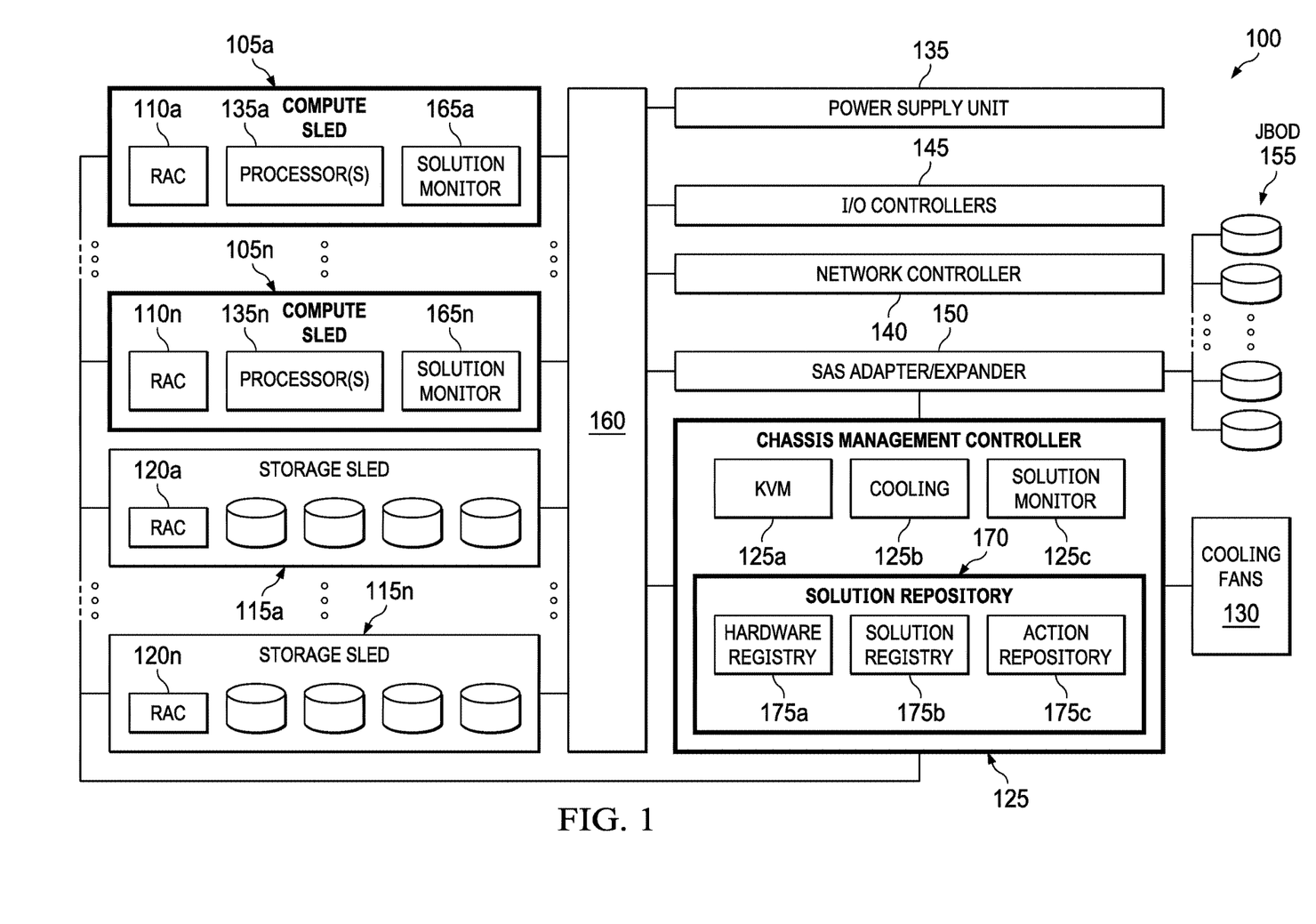
FIG. 1 is a block diagram illustrating example components of a chassis configured to transfer firmware updates using an in-band interface, according to some embodiments.

FIG. 1 is a block diagram illustrating certain components of chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays.

Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

By configuring chassis 100 with different sleds, the chassis may be adapted to support specific types of operations, thus providing a computing solution directed towards a specific type of computational task. For instance, chassis 100 that is configured to support artificial intelligence computing solutions may include additional compute sleds, compute sleds that include additional processors, and/or compute sleds that include specialized artificial intelligence processors or other specialized artificial intelligence components, such as specialized FPGAs. In another example, chassis 100 configured to support specific data mining operations may include network controllers 140 that support high-speed couplings with other similarly configured chassis, thus supporting high-throughput, parallel-processing computing solutions.

In another example, chassis 100 configured to support certain database operations may be configured with specific types of storage sleds 115a-n that provide increased storage space or that utilize adaptations that support optimized performance for specific types of databases. In other scenarios, chassis 100 may be configured to support specific enterprise applications, such as by utilizing compute sleds 105a-n and storage sleds 115a-n that include additional memory resources that support simultaneous use of enterprise applications by multiple remote users. In another example, chassis 100 may include compute sleds 105a-n and storage sleds 115a-n that support secure and isolated execution spaces for specific types of virtualized environments.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. Chassis 100 may alternatively or additionally include one or more cooling fans 130 that may be similarly operated to ventilate heated air from within sleds 105a-n, 115a-n installed within the chassis. A rack and chassis 100 installed within the rack may utilize various configurations and combinations of cooling fans to cool sleds 105a-n, 115a-n and other components housed within chassis 100.

Sleds 105a-n and/or 115a-n may be individually coupled to chassis 100 via connectors that correspond to the bays provided by the chassis 100 and that physically and electrically couple an individual sled to backplane 160. Chassis backplane 160 may be a printed circuit board that includes electrical traces and connectors that are configured to route signals between the various components of chassis 100 that are connected to backplane 160. In various embodiments, backplane 160 may include various additional components, such as cables, wires, midplanes, backplanes, connectors, expansion slots, and multiplexers.

In certain embodiments, backplane 160 may be a motherboard that includes various electronic components installed thereon. In some embodiments, components installed on a motherboard backplane 160 may include components that implement all or part of the functions described with regard to components such as the SAS (Serial Attached SCSI) expander 150, I/O controllers 145, network controller 140 and power supply unit 135.

Figure 2:
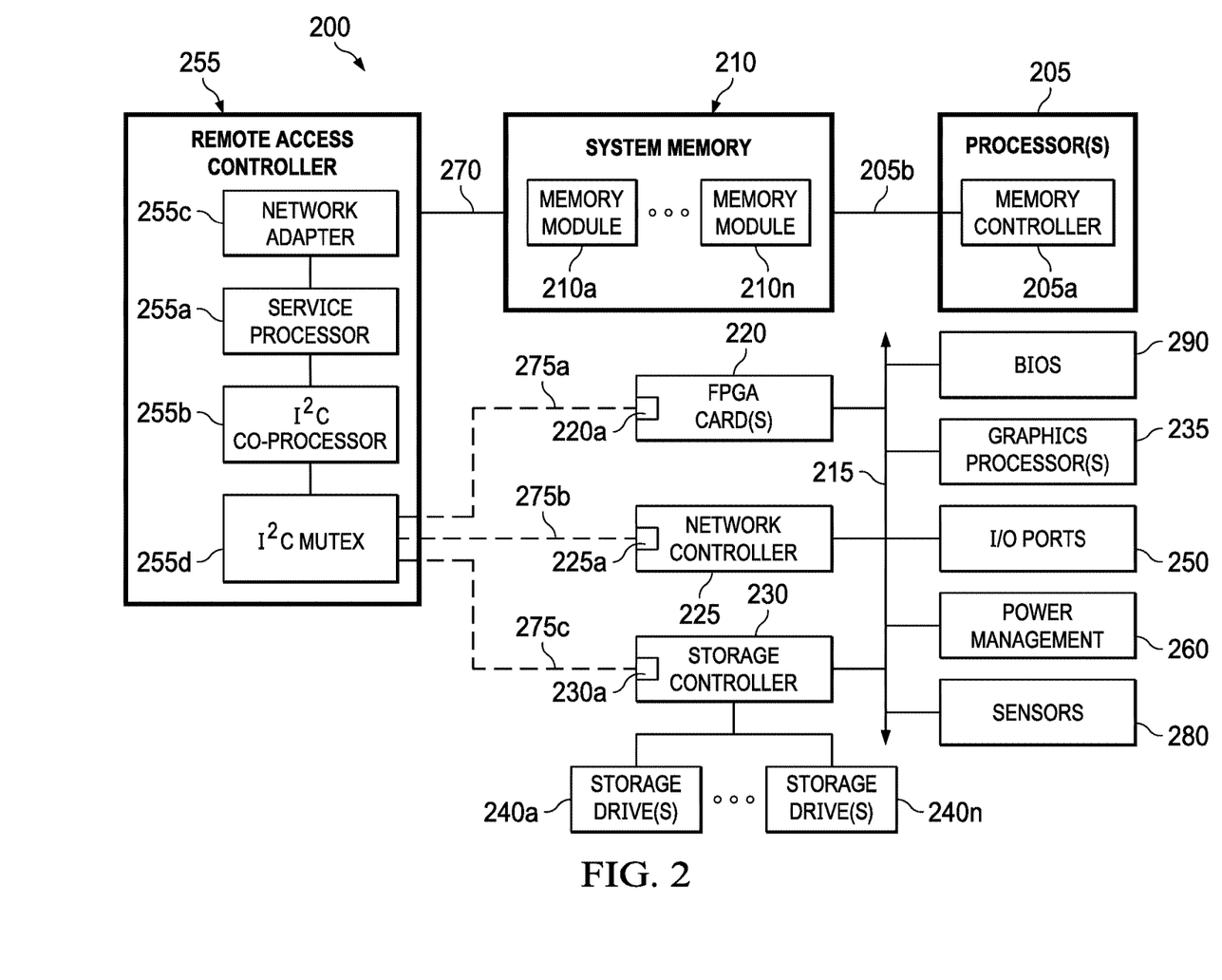
FIG. 2 is a block diagram illustrating example components of an Information Handling System (IHS) configured to transfer firmware updates using an in-band interface, according to some embodiments.

In certain embodiments, compute sled 105a-n may be an IHS such as described with regard to IHS 200 of FIG. 2. Compute sled 105a-n may provide computational processing resources that may be used to support a variety of e-commerce, multimedia, business and scientific computing applications, in some cases as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks in support of specific computing solutions.

As illustrated, each compute sled 105a-n includes a remote access controller (RAC) 110a-n. Remote access controller(s) 110a-n provide capabilities for remote monitoring and management of compute sled(s) 105a-n. In support of these monitoring and management operations, remote access controllers 110a-n may utilize both in-band and sideband (i.e., out-of-band) communications with various internal components of compute sled 105a-n and with other components of chassis 100. Remote access controller 110a-n may collect sensor data, such as temperature sensor readings, from components of chassis 100 in support of airflow cooling of chassis 100 and sleds 105a-n, 115a-n. In some embodiments, remote access controllers 110a-n may support communications with chassis management controller 125 by reporting configuration information for use in automatically configuring replacement components of the chassis 100 in order to support a particular computing solution.

Compute sled 105a-n may include one or more processors 135a-n that support specialized computing operations, such as high-speed computing, artificial intelligence processing, database operations, parallel processing, graphics operations, streaming multimedia and/or isolated execution spaces for virtualized environments. Using such specialized processor capabilities of a compute sled 105a-n, chassis 100 may be adapted for a particular computing solution. As indicated in FIG. 1, compute sled(s) 105a-n may also include solution monitor(s) 165a-n.

An individual solution monitor 165a may monitor the hardware and/or software capabilities of a compute sled 105a that are related to computing solutions that may be supported by chassis 100. In addition, solution monitor 165a may report any detected changes to the hardware and/or software capabilities of compute sled 105a that are related to a supported computing solution. The settings and changes detected by solution monitors 165a-n may be reported to chassis management controller 125 for use in automated configuration of replaceable chassis components for supporting computing solutions.

In some embodiments, each compute sled 105a-n may include a storage controller that may be utilized to access storage drives that are accessible via chassis 100. Some of the individual storage controllers may provide support for RAID (Redundant Array of Independent Disks) configurations of logical and physical storage drives, such as storage drives provided by storage sleds 115a-n. In some embodiments, some or all of the individual storage controllers utilized by compute sleds 105a-n may be HBAs (Host Bus Adapters) that provide more limited capabilities in accessing physical storage drives provided via storage sleds 115a-n and/or via SAS expander 150.

As illustrated, chassis 100 also includes one or more storage sleds 115a-n that are coupled to backplane 160 and installed within one or more bays of chassis 200 in a similar manner to compute sleds 105a-n. Each of individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations.

Storage sleds 115a-n may be utilized in various storage configurations by the compute sleds 105a-n that are coupled to chassis 100. As illustrated, each storage sled 115a-n may include a remote access controller (RAC) 120a-n. Remote access controllers 120a-n may provide capabilities for remote monitoring and management of storage sleds 115a-n in a similar manner to the remote access controllers 110a-n included in compute sleds 105a-n.

In addition to the data storage capabilities provided by storage sleds 115a-n, chassis 100 may provide access to other storage resources that may be installed components of chassis 100 and/or may be installed elsewhere within a rack housing chassis 100, such as within a storage blade. In certain scenarios, such storage resources 155 may be accessed via SAS expander 150 that is coupled to backplane 160 of chassis 100. SAS expander 150 may support connections to a number of JBOD (Just a Bunch Of Disks) storage drives 155 that may be configured and managed individually and without implementing data redundancy across various drives 155. Additional storage resources 155 may also be at various other locations within a datacenter in which chassis 100 is installed. Such additional storage resources 155 may also be remotely located from chassis 100.

As illustrated, chassis 100 of FIG. 1 includes network controller 140 that provides network access to sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, network controllers 140 may be replaceable components that include capabilities that support certain computing solutions, such as network controllers 140 that interface directly with network controllers from other chassis in support of clustered processing capabilities that utilize resources from multiple chassis.

Chassis 100 may also include power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In such embodiments, power supply unit 135 is a replaceable component that may be used in support of certain computing solutions.

Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125a capabilities that provide administrators with the ability to interface with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing power 135, network bandwidth 140, and airflow cooling 130 that are available via chassis 100. As described, airflow cooling 130 utilized by chassis 100 may include an airflow cooling system that is provided by a rack in which chassis 100 may be installed and managed by cooling module 125b of chassis management controller 125.

Components of chassis 100 such as compute sleds 105a-n may include solution monitoring 165a-n capabilities that report configurations and changes related to computing solutions. Chassis management controller 125 may similarly include a solution monitor 125c that tracks computing solution configuration settings for some chassis components.

Power supply unit 135 and network controller 140 may be replaceable components that may be configured in support of computing solutions. Solution monitor 125c of chassis management controller 125 may query such components for settings related to computing solutions and may detect any changes to these replaceable components that may affect support for computing solutions.

As illustrated, chassis management controller 125 may include solution repository 170 that stores computing solution configuration information for components of the chassis 100. For instance, chassis management controller 125 may record configuration information received from solution monitors 165a-n, 125c of chassis 100 in solution repository 170. In some embodiments, solution repository 170 may include hardware register 175a used for tracking the replaceable hardware components currently installed within chassis 100, as well as valid hardware settings for these replaceable components, such as supported firmware versions, BIOS settings and boot settings for each of the replaceable components.

As replaceable hardware components are identified and their settings are collected, the chassis management controller augments the hardware registry to include these settings as valid hardware configurations for each type of replaceable component. In some cases, computing solution configurations may also be received by chassis management controller 125 from an administrative source, where the received configurations specify valid computing solution configurations (i.e., computing solution blueprints) that identify hardware components and component configurations that may comprise a computing solution.

Received blueprints may include a preferred configuration for a computing solution as well as alternative configurations supported by a computing solution. For instance, a blueprint may specify a preferred components for use in implementing a particular computing solution, such as a preference for use of a compute sled that includes a specialized artificial intelligence processor, as well as alternative components, such as compute sleds that include processors that operate as speeds above a specified threshold and include specific types and amounts of memory. In another example, a blueprint may specify a preferred network controller 140 model, and it may also specify alternate models that may instead be used in valid computing solution configurations.

In some embodiments, solution repository 170 may also include solution registry 175b used for recording settings for configuring the replaceable hardware components of chassis 100 in support of one or more computing solutions. For instance, solution registry 175b may include settings for configuring specific enterprise applications, such as databases or other business software, supported by a computing solution. Solution registry 175b may also include settings for configuring virtual interfaces that are formed from logically combining multiple replaceable components, such as logical combinations of storage sleds 115a-n that present a single storage interface or logical combinations of network controllers 140 that present a single network interface.

Solution registry 175b may also include settings for configuring the operating systems of compute nodes 105a-n for participation in a computing solution, such as installing artificial intelligence, e-commerce, database or other computing packages for use in support of a computing solution. Such operating system configurations included in solution registry 175b may include settings for utilizing virtual interfaces formed from logical combinations of replaceable hardware components of the chassis.

In certain embodiments, solution repository 170 may also include an action repository 175c that may be used to generate scripts and commands used to configure replaceable hardware components with the configuration information available in hardware registry 175a and solution registry 175b. Action repository 175c may generate scripts that include settings for configuring a replaceable hardware component, as well as validating the replaceable hardware component as being suitable for use in support of a computing solution and testing a configured component in order to ensure it is properly configured for use by a computing solution.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs (e.g., laptops, desktops, tablet computers, smart phones, smart watches, smart appliances, Internet-of-Things or "IoT" devices, etc.). In the illustrative embodiment of FIG. 2, IHS 200 may be a computing component, such as compute sled 105a-n, that is configured to share infrastructure resources provided by chassis 100 in support of specific computing solutions.

In some implementations, IHS 200 may be a compute sled, such as compute sleds 105a-n of FIG. 1, that may be installed within a chassis, that may in turn be installed within a rack. Accordingly, IHS 200 may be comprised within a large system of similarly configured IHSs that may be housed within the same chassis, rack and/or datacenter. IHS 200 may utilize one or more processor(s) 205. In some embodiments, processor(s) 205 may include a main processor and a co-processor, each of which may include a plurality of processing cores that, in certain scenarios, may each be used to run an instance of a server process. In certain embodiments, one, some or all processor(s) 205 may be graphics processing units (GPUs).

In some embodiments, one, some or all processor(s) 205 may be specialized processors, such as artificial intelligence processors or processor adapted to support high-throughput parallel processing computations. As described, such specialized adaptations of IHS 200 may be used to implement specific computing solutions support by the chassis in which IHS 200 is installed.

As illustrated, processor(s) 205 includes integrated memory controller 205a that may be implemented directly within the circuitry of processor(s) 205, or memory controller 205a may be a separate integrated circuit that is located on the same die as processor 205. Memory controller 205a may be configured to manage the transfer of data to and from system memory 210 via high-speed memory interface 205b.

System memory 210 is coupled to processor(s) 205 via memory bus 205b that provides processor(s) 205 with high-speed memory used in the execution of computer program instructions by processor(s) 205. Accordingly, system memory 210 may include memory components, such as such as static RAM (SRAM), dynamic RAM (DRAM), NAND Flash memory, suitable for supporting high-speed memory operations by processor(s) 205. In certain embodiments, system memory 210 may combine both persistent, non-volatile memory and volatile memory.

In certain embodiments, system memory 210 may be comprised of multiple removable memory modules. System memory 210 of the illustrated embodiment includes removable memory modules 210a-n. Each of removable memory modules 210a-n may correspond to a printed circuit board memory socket that receives a respective removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each of processor(s) 205. All or portions of the chipset may be implemented directly within the integrated circuitry of an individual processor(s) 205. The chipset may provide processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components. In certain embodiments, I/O ports 250 may provide couplings to the backplane of the chassis in which IHS 200 is installed.

As illustrated, a variety of resources may be coupled to the processor(s) 205 of IHS 200 via bus 215. For instance, processor(s) 205 may be coupled to a network controller 225, such as provided by a Network Interface Controller (NIC) that is coupled to IHS 200 and allows IHS 200 to communicate via an external network, such as the Internet or a LAN. Processor(s) 205 may also be coupled to a power management unit 260 that may interface with the power system unit 135 of chassis 100 in which n IHS 200, such as a compute sled, may be installed. In certain embodiments, graphics processor 235 may be comprised within one or more video or graphics cards, or an embedded controller, installed as components of IHS 200. In certain embodiments, graphics processor 235 may be integrated into remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by FPGA card 220. Each individual FGPA card 220 may be optimized to perform specific processing tasks, such as specific signal processing, security, data mining, and artificial intelligence functions, and/or to support specific hardware coupled to IHS 200. In certain embodiments, such specialized functions supported by an FPGA card 220 may be utilized by IHS 200 in support of certain computing solutions. In such embodiments, the instructions used to program FPGA 220 may be reported to the chassis management controller along with other settings of IHS 200 that are used to implement supported computing solutions.

IHS 200 may also support one or more storage controllers 230 that may be utilized to provide access to virtual storage configurations. For instance, storage controller 230 may provide support for RAID (Redundant Array of Independent Disks) configurations of storage devices 240a-n, such as storage drives provided by storage sleds 115a-n and/or JBOD 155 of FIG. 1. In some embodiments, storage controller 230 may be an HBA (Host Bus Adapter).

In certain embodiments, IHS 200 may operate using BIOS 290 (Basic Input/Output System) that may be stored in a non-volatile memory accessible by processor(s) 205. BIOS 290 may provide an abstraction layer by which the operating system of IHS 200 interfaces with the hardware components of IHS 200. Upon powering or restarting IHS 200, processor(s) 205 may utilize BIOS instructions to initialize and test hardware components coupled to IHS 200, including both components permanently installed as components of the motherboard of IHS 200 and removable components installed within various expansion slots supported by the IHS 200.

BIOS instructions may also load an operating system for use by the IHS 200. In some embodiments, BIOS instructions may be reported to the chassis management controller along with other settings of IHS 200 that are used to implement supported computing solutions. In certain embodiments, IHS 200 may utilize Unified Extensible Firmware Interface (UEFI) in addition to or instead of BIOS 290. In certain embodiments, the operations provided by a BIOS may be implemented, in full or in part, by RAC 255.

In certain embodiments, remote access controller 255 may operate from a different power plane from the processors 205 and other components of IHS 200, thus allowing remote access controller 255 to operate, and management tasks to proceed, while the processing cores of IHS 200 are powered off. As described, various operations provided by BIOS 290, including launching the operating system of IHS 200, may be implemented by the remote access controller 255. In some embodiments, remote access controller 255 may perform various functions to verify the integrity of IHS 200 and its hardware components prior to initialization of IHS 200 (i.e., in a bare-metal state).

Remote access controller 255 may include service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely. In some embodiments, instructions used to configure remote access controller 255 may be reported to the chassis management controller along with other settings of IHS 200 that are used to implement supported computing solutions.

In some embodiments, remote access controller 255 may be directly coupled to system memory 210 via in-band interface 270. Moreover, remote access controller 255 may support monitoring and administration of various devices 220, 225, 230 via a sideband interface 225a-c. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection(s) 275a-c.

In certain embodiments, service processor 255a of remote access controller 255 may rely on I2C co-processor 255b to implement sideband I2C communications between remote access controller 255 and managed components 220, 225, 230 of the IHS. I2C co-processor 255b may be a specialized co-processor or micro-controller that is configured to interface via a sideband I2C bus interface with the managed hardware components 220, 225, 230 of IHS 200. In some embodiments, I2C co-processor 255b may be an integrated component of the service processor 255a, such as a peripheral system-on-chip feature that may be provided by service processor 255a. Each I2C bus 275a-c is illustrated as single line in FIG. 2. However, each I2C bus 275a-c may be comprised of a clock line and data line that couple the remote access controller 255 to I2C endpoints 220a, 225a, 230a.

As illustrated, the I2C co-processor 255b may interface with individual managed devices 220, 225, and 230 via individual sideband I2C buses 275a-c selected through the operation of I2C multiplexer 255d. Via switching operations by I2C multiplexer 255d, a sideband bus connection 275a-c may be established by a direct coupling between the I2C co-processor 255b and an individual managed device 220, 225 or 230.

In providing sideband management capabilities, I2C co-processor 255b may each interoperate with corresponding endpoint I2C controllers 220a, 225a, 230a that implement the I2C communications of the respective managed devices 220, 225, 230. The endpoint I2C controllers 220a, 225a, 230a may be implemented as a dedicated microcontroller for communicating sideband I2C messages with the remote access controller 255, or endpoint I2C controllers 220a, 225a, 230a may be integrated SoC functions of a processor of the respective managed device endpoints 220, 225, 230.

IHS 200 may include a solution monitor that collects and monitors settings of the IHS 200 that relate to supported computing solutions. In some embodiments, a solution monitor may be implemented as a process of remote access controller 255, where the solution configuration information from IHS 200 components 220, 225, 230 may be collected by service processor 255a via out-of-band management connections 275a-c supported by I2C co-processor 255b. The collected configuration information may then be reported to the chassis management controller via a connection supported by the network adapter 255c of the remote access controller 255. In embodiments where IHS 200 is a compute sled, upon being coupled to a chassis, remote access controller 255 may receive configuration scripts from a chassis management controller for use in configuring IHS 200 in support of a particular computing solution.

Sensors 280 may provide access to data describing environmental and operating conditions of IHS 200 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some cases, processor(s) 205 may be configured to use context information collected by sensors 280 to determine the relative orientation and movement of IHS 200. For instance, the sensor hub may utilize inertial movement sensors, that may include accelerometer, gyroscope, and magnetometer sensors, and are capable of determining the current orientation and movement of IHS 200 (e.g., IHS 200 is motionless on a relatively flat surface, IHS 200 is being moved irregularly and is likely in transport, the hinge of IHS 200 is oriented in a vertical direction). In certain embodiments, processor(s) 205 may also determine a location and movement of IHS 200 based on triangulation of network signal and based on network information provided by the OS or network interface. In some embodiments, processor(s) 205 may support additional sensors, such as optical, infrared and sonar sensors, that may provide support for xR (virtual, augmented, and/or mixed reality) sessions hosted by IHS 200 and may be used to provide an indication of a user's presence near IHS 200, such as whether a user is present, absent, and/or facing an IHS display.

In cases where an end-user is present before IHS 200, processor(s) 205 may further determine a distance of the end-user from the IHS, where this determination may be made continuously, at periodic intervals, or upon request. The detected or calculated distances may be used by processor(s) 205 to classify the user as being in the IHS's near-field (user's position<threshold distance A), mid-field (threshold distance A<user's position<threshold distance B, where B>A), or far-field (user's position>threshold distance C, where C>B).

In embodiments where IHS 200 may support multiple physical configurations, such as a convertible laptop, N-in-1 device, or the like, processor(s) 205 may utilize one or more mode sensors 280 that collect readings that may be used in determining the current posture in which IHS 200 is physically configured. In certain embodiments, such posture determinations may be additionally made using the movement and orientation information provided by sensors 280.

In laptop and convertible laptop embodiments, for example, processor(s) 205 may utilize a lid position sensor 280 to determine the relative angle between the two panels of the laptop in order to determine the mode in which IHS 200 is physically configured. In such embodiments, lid position sensor 280 may measure the angle of rotation of the hinge that connects the base panel and lid panel of IHS 200. In some cases, processor(s) 205 may collect lid position information, such as the hinge angle, to then use in determining the posture in which IHS 200 is configured.

Processor(s) 205 may determine the posture of IHS 200 based, at least in part, on the angle of rotation of the hinge of IHS 200 from a closed position. A first range of hinge angles from a closed position may indicate a laptop posture, a second range of hinge angles may indicate a landscape posture and a third range of angles may indicate a tablet posture. Processor(s) 205 may additionally utilize orientation and movement information collected from inertial movement sensors 280 to further determine the posture in which IHS 200 is physically configured. For instance, if processor(s) 205 determine that IHS 200 is configured with a hinge angle of a laptop configuration, but IHS 200 is oriented on its side, IHS 200 may be determined to be in a book mode. If IHS 200 is determined to be tilted such that the hinge is oriented between horizontal and vertical, the user's face is detected to be facing the integrated display, and IHS 200 is experiencing slight movement, processor(s) 205 may determine that IHS 200 is being used in a book posture. Processor(s) 205 may determine that IHS 200 is opened to a 180-degree hinge angle and lies on a flat surface, thus indicating that IHS 200 it is being used in a landscape posture. Processor(s) 205 may similarly determine that IHS 200 is in a tent configuration, in response to detecting a hinge angle within a defined range, such as between 300 and 345 degrees, such that the hinge is aligned horizontally and is higher than both display panels of IHS 200.

In some implementations, IHS 200 may not include each of the components shown in FIG. 2. In other implementations, IHS 200 may include other components in addition to those that are shown in FIG. 2. Furthermore, some components that are represented as separate components in FIG. 2 may instead be integrated with other components. For example, all or a portion of the functionality provided by two or more discrete components may instead be provided by components that are integrated into processor(s) 205 as a systems-on-a-chip.

Figure 3:
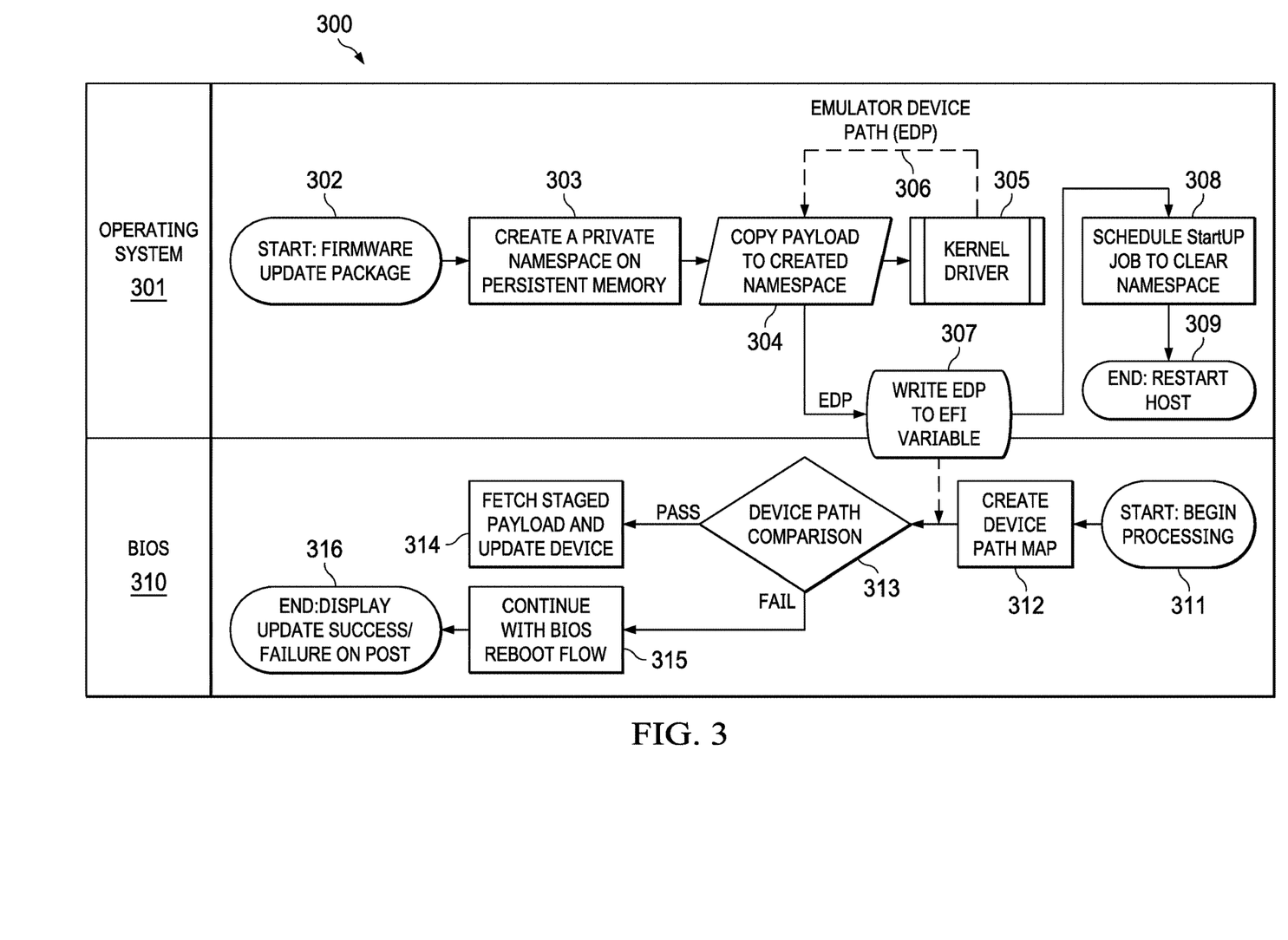
FIG. 3 is a flowchart of an example of a method for transferring firmware updates using an in-band interface, according to some embodiments.

FIG. 3 is a flowchart diagram illustrating an example of method 300 for transferring firmware updates using an in-band interface. In some embodiments, method 300 may be performed by processor(s) 205 in cooperation with RAC 255 and/or BIOS 290, at least in part, in response to the execution of program instructions stored in memory 210. Broadly speaking, method 300 enables the selective transferring of device firmware images from RAC 255 to devices 220, 225, and 230 through in-band interface 270, rather than sideband interfaces 275a-c.

A designated namespace with reserved Globally Unique Identifier (GUID) may be registered with the system being used to temporarily hold the firmware image. A UEFI device path may be created, translated by an OS driver, and written to BIOS 290. During a reboot, BIOS 290 creates a device path map, and the update device identification is deemed successful upon matching of the UEFI device path against the map.

As such, method 300 may restrict data contention to a single partition to avoid scanning of multiple dual in-line memory modules (DIMMs) or non-volatile DIMMs (NVDIMMs) to rebuild the payload image from firmware update packets received by RAC 255, thus avoiding data retention and error prone double data rate (DDR) synchronous dynamic random-access memory (SDRAM). Accessing data from persistent memory using in-band interface 270 is faster than accessing data from a hard drive, or any other storage; and processing data from persistent memory is easier for BIOS 290.

Still referring to FIG. 3, blocks 302-309 provide a staging of firmware payload performed by OS 301, whereas blocks 311-316 provide device update initiation performed by BIOS 290. Particularly, method 300 beings at block 302. At block 303, method 300 creates a private namespace on persistent memory—e.g., a storage class memory (SCM) or an NVDIMM. A namespace is a declarative region that provides a scope to the identifiers (the names of types, functions, variables, etc.) inside of it. At block 304, method 300 copies the firmware update payload to the created namespace for the obtained memory segment(s) and notifies OS or kernel drive 305 to in turn provide an Emulator Device Path (EDP) 306. At block 307, EDP 306 is saved as an EFI variable to a corresponding EFI partition. Block 308 schedules a startup job to clear the namespace, and block 309 restarts IHS 200.

At block 311, method 300 begins processing a reboot using BIOS 310, and at block 312 a device path map is created; BIOS 310 looks out for the staged EDP in reserved EFI variable instance. At block 313, method 300 compares EDP 306 to the device path map. At block 314, if the comparison finds a match, method 300 fetches the staged payload from the memory segment corresponding to the namespace and updates the firmware of a selected or corresponding device identified in the payload (e.g., 220, 225, and/or 230). Otherwise, if there is no match, block 315 continues with the BIOS reboot flow before method 300 ends at block 316.

In some cases, the decision of whether to perform the transfer of firmware updates using in-band interface 270 or sideband interfaces 275a-c may be based upon context information obtained by sensors 280. For example, when the user is in the near-field of IHS 200, method 300 may use in-band interface 270 to transfer firmware payloads and when the user is the far-field, side-band interfaces 225a-c may be used, or vice-versa. When IHS 200 is a laptop posture, with a lid open, and/or a first range of hinge angles is detected, method 300 may use in-band interface 270 to transfer firmware payloads and when IHS 200 is a tablet posture, with lid closed, and/or a second range of hinge angles is detected, side-band interfaces 225a-c may be used, or vice-versa.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and a memory coupled to the processor, the memory having program instructions stored thereon that, upon execution, cause the IHS to:
    receive a firmware update package having a payload;
    create a namespace in a persistent memory;
    copy the payload to a segment of the persistent memory associated with the namespace;
    write, to an Extensible Firmware Interface (EFI) variable, an Emulator Device Path (EDP) pointing to the payload;
    compare a device path map against the EDP using the Basic Input/Output System (BIOS);
    in response to a match between the EDP and a path in the device path map, obtain the payload using the BIOS and update a corresponding device firmware using the payload; and
    reboot.

2. The IHS of claim 1, wherein to receive, create, copy, and write, the IHS uses an Operating System (OS).

3. The IHS of claim 1, wherein the persistent memory comprises a non-volatile dual in-line memory module (NVDIMM) or storage class memory (SCM).

4. The IHS of claim 1, wherein the EDP is provided by a kernel driver.

5. A memory storage device having program instructions stored thereon that, upon execution by one or more processors of an Information Handling System (IHS), cause the IHS to:
    receive a firmware update package having a payload;
    create a namespace in a persistent memory;
    copy the payload to a segment of the persistent memory associated with the namespace;
    write, to an Extensible Firmware Interface (EFI) variable, an Emulator Device Path (EDP) pointing to the payload;
    compare a device path map against the EDP using a Basic Input/Output System (BIOS);
    in response to a match between the EDP and a path in the device path map, obtain the payload using the BIOS and update a corresponding device firmware using the payload; and
    reboot.

6. The memory storage device of claim 5, wherein to receive, create, copy, and write, the IHS uses an Operating System (OS).

7. The memory storage device of claim 5, wherein the persistent memory comprises a non-volatile dual in-line memory module (NVDIMM) or storage class memory (SCM).

8. The memory storage device of claim 5, wherein the EDP is provided by a kernel driver.

9. A method, comprising:
    receiving a firmware update package having a payload;
    creating a namespace in a persistent memory;
    copying the payload to a segment of the persistent memory associated with the namespace;
    writing, to an Extensible Firmware Interface (EFI) variable, an Emulator Device Path (EDP) pointing to the payload;
    comparing a device path map against the EDP using a Basic Input/Output System (BIOS);
    in response to the EDP matching a path in the device path map, obtaining the payload using the BIOS and updating a corresponding device firmware using the payload; and
    rebooting.

10. The method of claim 9, wherein the receiving, creating, copying, and writing are performed by an Operating System (OS).

11. The method of claim 9, wherein the EDP is provided by a kernel driver.

* * * * *